UNITED STATES PATENT OFFICE.

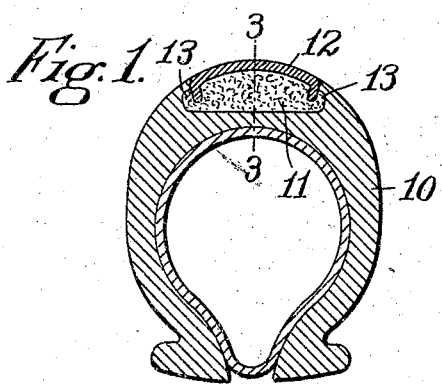
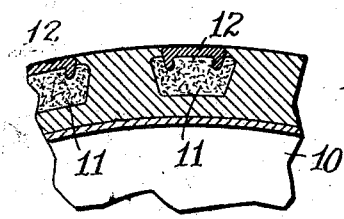
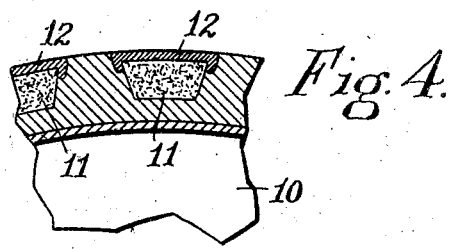
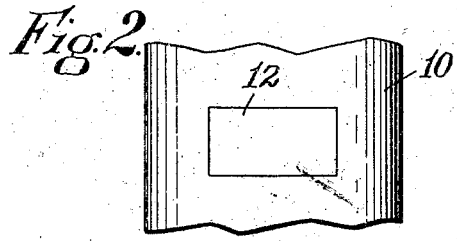
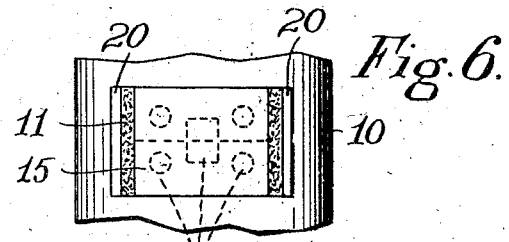
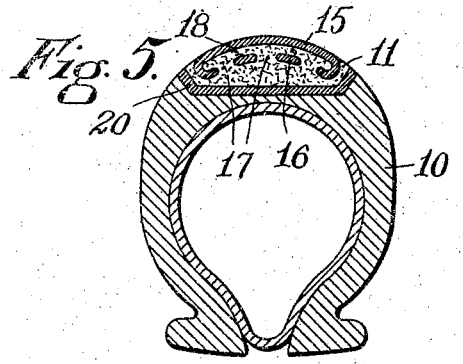
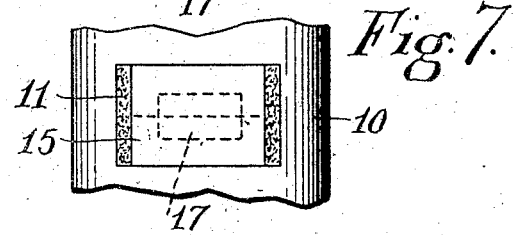
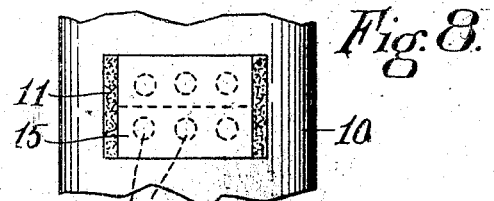

GEORGE D. MOORE AND RALPH L. MORGAN, OF WORCESTER, MASSACHUSETTS.

ARMORED TIRE.

992,796.  Specification of Letters Patent.  Patented May 23, 1911.

Application filed October 16, 1909. Serial No. 522,973.

*To all whom it may concern:*

Be it known that we, GEORGE D. MOORE and RALPH L. MORGAN, citizens of the United States, both residing at Worcester, in the county of Worcester and State of Massachusetts, have invented a new and useful Armored Tire, of which the following is a specification.

This invention relates to a tire for vehicles and to a method of making the same.

The principal objects of the invention are to provide means for protecting the tire against puncture and wear, such means being of such material and construction that it can be made in the form of rigid inserts separated from each other by transverse masses of softer rubber, so that the necessary elasticity is provided, but substantially integrally connected with the body of the tire so that there will be no danger of the inserts being separated from the tire in use or of their cutting into the adjacent portions of the softer rubber; to provide a simple and convenient method of making the same; and to provide additional metallic armor plates in connection therewith secured firmly in position by the rigid inserts or by the body of soft rubber.

Another object of the invention is to provide an improved form of metallic armor of such construction that it contains a body of rubber within, integrally connected with the rubber without, so that it is firmly anchored to the body of the rubber.

Further objects and advantages of the invention will appear hereinafter.

Reference is to be had to the accompanying drawings in which—

Figure 1 is a transverse sectional view of a rubber tire constructed in accordance with this invention and showing it in a simple form. Fig. 2 is a plan of a portion of the tire. Fig. 3 is a sectional view on the line 3—3 of Fig. 1. Fig. 4 is a longitudinal sectional view showing a modification. Fig. 5 is a transverse sectional view of a tire showing another form of the invention. Fig. 6 is a plan of the same, and Figs. 7 and 8 are plans of modifications.

Various forms of metallic armor have been proposed for rubber tires and they are all open to the objection that it is impossible to cure the rubber to the metal in such a way as to unite them by a joint even approximately as strong as the adjacent portions of the rubber. Consequently, the metallic armor plates readily become loosened in use and not only tend to be detached, but they also tend to cut into the adjacent surfaces of the rubber. Moreover, by having a joint along the edge of the armor plate, each joint is liable to become distorted by flexure of the rubber so that the rubber adjacent to the joint often tends to separate and extend a crack directly into the body of the rubber.

This invention is made for the purpose of providing a form of armor which, while substantially as efficient as the metal for the purpose of preventing a puncture, can be so firmly united to the body of the rubber that the above mentioned difficulties will not arise. For this purpose the body of the outer tube is made up mainly of soft rubber reinforced by fabric or the like, as is usually the case. The tread is made up in part of comparatively rigid plates, or inserts formed of non-metallic material which can be cured or vulcanized to the soft rubber so that the two bodies will be integrally united by means of a joint which will be as strong as the adjacent portions of the soft rubber. With this arrangement there is no danger of the inserts or plates working loose in practice, and they are capable of securely holding metallic armor plates. At the same time, as these reinforcing plates are separated from each other by transverse masses of flexible soft rubber the tread has the necessary elasticity.

Referring to the drawings, it will be seen that a tire or outer shoe is shown having a main body 10 preferably composed of soft rubber and fabric in the usual way. Along the tread of this tire are placed transverse plates or inserts represented by the numeral 11 formed of a non-metallic material which can be integrally united with the soft rubber, as for example, hard rubber or gutta percha compounds.

The method of manufacture preferably followed is as follows:—The material for the main body 10 is placed in a mold and formed up with spaces corresponding to the shape of the plates or inserts 11 along the tread thereof. A soft rubber mixture with or without fabric is used for the main body 10. Into the above mentioned spaces are placed masses of rubber or gutta percha compounds, or the like, which preferably is partially cured in advance. The inserts can be placed in the mold first if desired and secured in position and the body of soft rubber or soft rubber and fabric molded around them. In either case the whole thing is subjected to a vulcanizing temperature, or is otherwise treated, so as to cure the two materials at the same time. While the ordinary soft rubber in the body 10 will be the same as that which constitutes the body of the ordinary tire of this character, the inserts 11 will be cured to form a hard comparatively rigid substance, preferably hard rubber. Not only this but the two bodies of material are integrally united and the joint is of great strength on account of the two bodies being vulcanized together. Consequently the joint is at least as strong as the adjacent portions of the body of soft rubber. By manufacturing the tire or shoe in this way, rigid protecting inserts or armor are provided at intervals along the tread having the well known properties of hard rubber and capable of resisting puncture and wear to a very high degree and yet the necessary resiliency is retained. They are so firmly united with the soft rubber that if any force is applied tending to tear them away, they can be removed in this way only by tearing the soft rubber itself, as it will give away before the two materials will separate.

For the purpose of facilitating the final vulcanization of the hard inserts with the soft rubber forming the body of the tire, a thin shell or layer of a rubber or gutta percha compound 20 (Fig. 5) of a composition somewhat intermediate in character between that of the hard rubber and the soft body of the tire may be placed between the hard insert and the soft body. In the process of vulcanization this intermediate layer may serve to cure firmly to both the hard insert and the soft body, thus avoiding any possibility of an imperfect joint between the hard insert and the soft body of the tire. The properties of hard rubber and gutta percha compounds are well known and it will be obvious that in this position they not only have great durability but they will resist all manner of punctures. However, it is preferred to apply a further protection. This can be accomplished by adding a protecting metallic armor plate 12 to each plate 11. This plate is shown flush on the outside with the soft rubber portion of the tread. In this case the method of manufacture is substantially as follows: The metallic plates or members 12 are placed in the mold and the two non-metallic materials vulcanized together and around the projecting edges 13 of the armor plates. It is to be observed that if the plates 12 were placed in the mold and soft rubber merely vulcanized on them, there would not be a good holding joint between the two materials, but in this case the comparatively rigid body of hard rubber or the like 11 projects under the converging edge projections 13 and consequently securely holds the metallic armor plate in position thereon. As the inserts 11 are securely united to the main body 10 it will be seen that the tire itself is provided with rigid non-metallic masses 11 in which the armor plates are firmly held and that no ordinary usage to which the tire can be subjected will cause this rigid holding means to be distorted or forced away from the contacting surfaces of the metal. Therefore, the inserts serve as means for holding the metal in position.

Another way in which a metallic armor plate can be held still more firmly in position is shown in Figs. 5 and 6. In this case the armor consists of a flattened metallic tube formed into a curved shape. Its inner portion 16 preferably is curved parallel with the outer plate 15 and is provided with openings 17, having rounded edges. In this case as in Fig. 1, the comparatively rigid body of hard rubber projects under the converging sides of the metallic insert and consequently securely holds the same in position. It will be seen that the body of hard rubber 11 is united with the body 18 of the same material inside the tubular insert by integral masses extending through the openings 17 and by additional integral masses extending from the ends of the body 18. This integral union of the masses of rubber rigidly holds the metallic member in position in a most efficient manner and prevents any motion thereof with relation to the hard rubber body in which it is embedded.

In all cases the necessary resiliency is secured by the main body of soft rubber, the inserts or armor being substantially rigid.

While we have illustrated and described certain embodiments of the invention and a particular method of carrying it out, we are aware that many other modifications can be made both in the form of the article and in the method of manufacturing without departing from the scope of the invention as expressed in the claims. Therefore, we do not wish to be limited to all the details of construction shown or to the exact steps of the method described but

What we claim is:—

1. As an article of manufacture, a vehicle tire or outer shoe comprising a body composed mainly of flexible soft rubber, a plurality of rigid inserts composed of hard rubber vulcanized to the soft rubber and located at intervals along the wearing surface or tread thereof, and sheet metal members extending along the outer surfaces of the hard rubber inserts, said sheet metal members extending at opposite sides inwardly with respect to the tire and insert and in contact with the material of the inserts, whereby they are firmly secured thereto.

2. As an article of manufacture, a vehicle tire or shoe comprising a body composed mainly of soft rubber and having a tread composed partly of hard rubber, and a series of metallic members mounted on the hard rubber portions of said tread, and each comprising a member extending along the outer surface of the hard rubber and open at opposite sides, so that the body of rubber within the member is connected at the ends thereof with the body of rubber outside the member.

3. As an article of manufacture, a vehicle tire or outer shoe comprising a body composed mainly of flexible soft rubber, a plurality of rigid hard rubber inserts secured to the soft rubber by vulcanization, and located at intervals around the tire or shoe, and metallic members, each comprising an outside plate extending for a distance circumferentially and transversely along the outer surface of one of said inserts and of the tire or shoe, and having means extending inwardly from said outside plate for securing it firmly to the hard rubber insert.

4. As an article of manufacture, a vehicle tire or shoe comprising a body composed mainly of soft rubber and having a tread composed partly of hard rubber, and a series of metallic members embedded in the hard rubber portions of said tread and having an outer surface flush therewith, said members each comprising a curved flattened tube having an opening through its inner wall so that the body of rubber within the member is integral with that outside and is connected therewith at the ends of the tube and through the openings therein.

In testimony whereof we have hereunto set our hands, in the presence of two subscribing witnesses.

GEORGE D. MOORE.
RALPH L. MORGAN.

Witnesses:
  A. E. FAY,
  C. F. WESSON.